Figure 1:
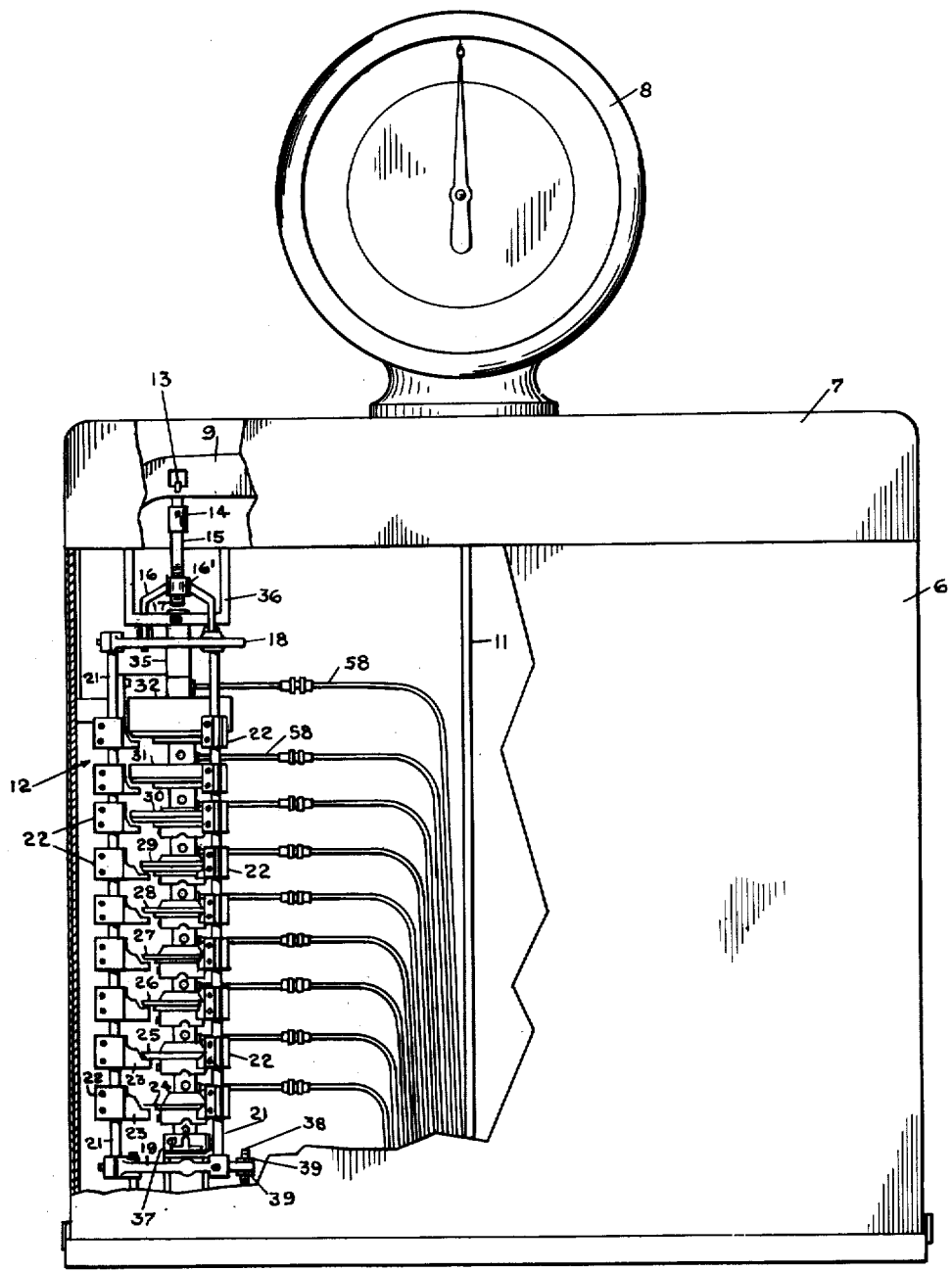

INVENTOR.
HARLAN A. HADLEY
BY
*Henry Sherman*
ATTORNEY

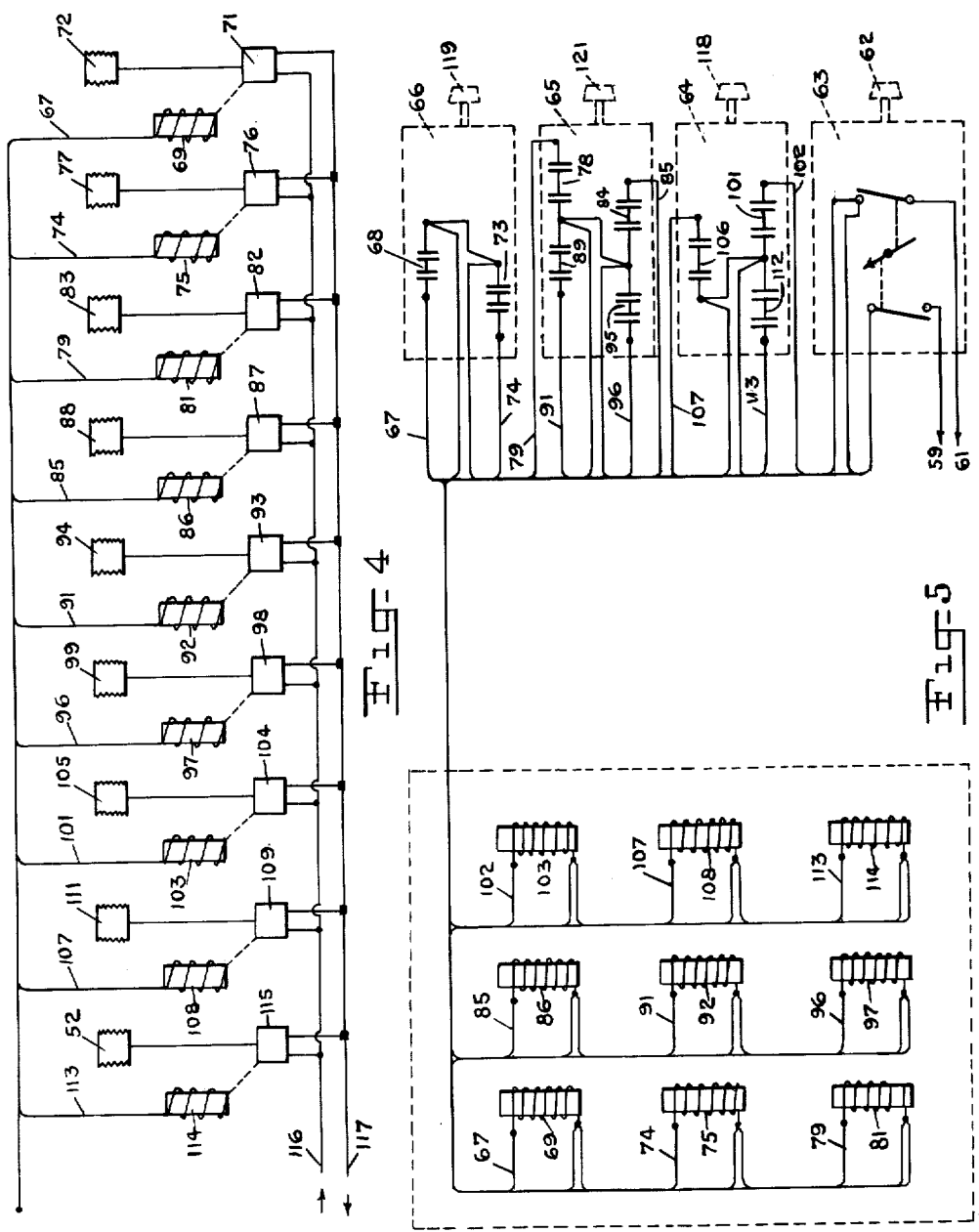

Patented Apr. 22, 1952

2,594,157

UNITED STATES PATENT OFFICE 2,594,157

WEIGHING SCALE

Harlan A. Hadley, Burlington, Vt., assignor to H. A. Hadley Associates, Inc., Burlington, Vt., a corporation of Vermont Application March 9, 1949, Serial No. 80,503

20 Claims. (Cl. 265—48)

This invention relates to weighing scales, and relates more particularly to weighing scales of the automatic load counter-balancing type which are provided with a plurality of manually controlled unit weights for increasing the weighing capacity of load counter-balancing components.

In weighing scales of this type, as heretofore commonly constructed, a series of unit weights, or auxiliary counterpoises, of predetermined weight value are suspended from but operatively disassociated from the weighing mechanism. When it is desired to increase the capacity of the weighing scale of this kind, means are operated to drop a unit weight on to a suitable supporting means operatively connected to the load counter-balancing means whereby the counterbalancing force is increased. The dropping of the unit weight on to its supporting means by the means heretofore employed often disturbed the pivot and bearing relationship, thus altering the pivot distances and inaccuracies in the weighing.

Another factor which contributed to lower considerably the efficiency of these weighing scales was the use of unit weights all of which were of the same mass, i. e. the mass of each was such that its moment was just sufficient to counterbalance the pull on the counter-balancing means exerted by a weight equal to the original weighing capacity of the scale.

An important object of this invention is the provision of an improved unit weight arrangement which will be free from the above mentioned and other disadvantages and which will be especially simple in construction and efficient in operation.

Another object of this invention is to provide an improved unit weight arrangement wherein the unit weights are selectively placed in operative position with respect to the load counterbalancing mechanism by fluid operated means.

A further object of this invention is to provide an improved unit weight arrangement wherein a series of unit weights each of which is of different mass is employed.

Other objects of this invention, together with certain details of construction and combinations of parts, will appear from the following detailed description and pointed out in the appended claims.

Figure 2:
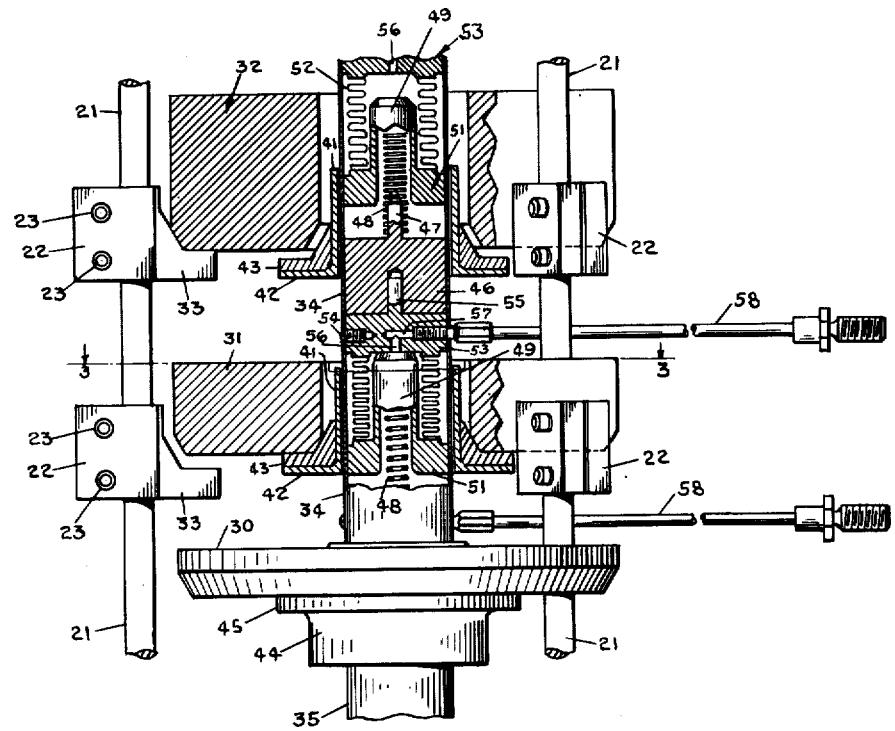
Figure 3:
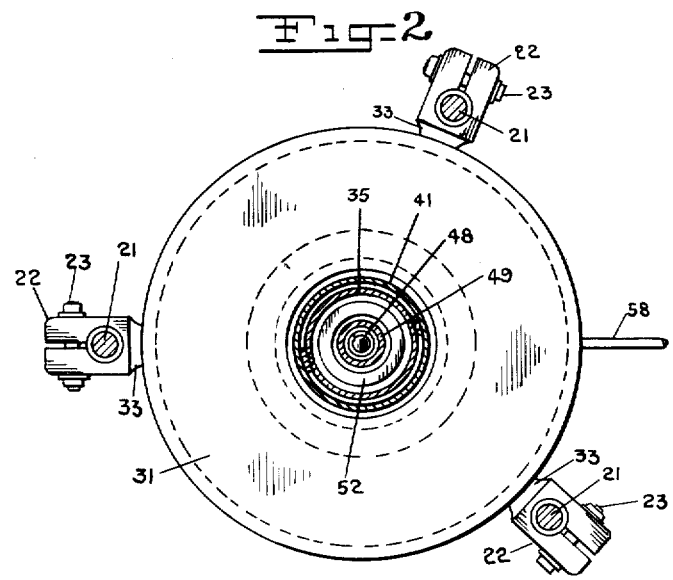

In the drawings, wherein a preferred embodiment of my invention is shown,

Fig. 1 is a front elevational view of a dial scale with parts broken away to show the unit weight arrangement of my invention as embodied therein, Fig. 2 is a sectional detail view, on an enlarged scale, of a portion of the unit weight arrangement of my invention, Fig. 3 is a view taken on line 3—3 in Fig. 2 in the direction of the arrows, Fig. 4 is a schematic view of the fluid flow for operating the unit weights, and Fig. 5 is a wiring diagram for the operation of the unit weight operating means.

Like reference numerals designate like parts throughout the several views of the drawings.

Since the unit weight arrangement of my invention may be used in connection with any desired type of counterbalancing mechanism as well as scale lever and platform structure, these elements of the weighing scale are not shown in detail.

Referring now to the drawings for a detailed description of my invention, reference numeral 6 indicates generally the main housing having a beam housing 7 which supports a dial head 8. Suitably mounted in beam housing 7 is a weighing beam 9 which is connected to the lever system (not shown) by draft rod 11 and to the load counterbalancing mechanism in dial head 8 in a manner well known in the art.

The unit weight mechanism of my invention, indicated generally by reference numeral 12, is pivotally suspended from one end of weighing beam 9 by means of a pivot and bearing assembly 13, a clevis 14, a rod 15 and a bracket 16. The bracket 16 is provided with an internally threaded collar 16' which cooperates with the threaded end 17 of rod 15 to permit vertical adjustment of the unit weight cage assembly.

The bracket 16 is attached to the unit weight cage which comprises an upper substantially annular ring 18 and a lower ring 19, also substantially annular in form, between which rings are supported three vertical rods 21. Each of said rods 21 carries a series of unit weight carrier blocks 22 which are split and are held in position on said rods 21 by means of bolts 23. The weight carrier blocks 22 are adapted to support unit weights 24, 25, 26, 27, 28, 29, 30, 31 and 32. To this end each of the carrier blocks 22 is provided with a projection or lug 33 of such contour as to form a seat which fits the contour of the unit weight which it is to support. Each three lugs 33 in the same plane support a unit weight and each of such projections will have the same contour.

The unit weights in inoperative position are supported on a tube generally indicated by reference numeral 34, which is joined by means of a bar 35 adjustably mounted within a bracket 36. The bracket 36 is suitably fixed to the underside of the beam housing 7. The lower end of tube 34 is also adjustably mounted within a bracket 37 fixed to the bottom of the main housing 6. The position of tube 34 within the unit weight cage may be adjusted and held rigidly in position between brackets 36 and 37. To prevent oscillation of the unit weight cage, the lower annular ring 19 is attached by means of a bolt 38, which is held in position by locknuts 39, to a suitable restraining device, such as a check link (not shown).

The tube 34 houses a plurality of separate units each holding a single unit weight in inoperative position and adapted to seat the same on projections 33 of the carriers 22 when it is desired to deposit a unit weight in operative position. The tube 34 carries for movement relative thereto a plurality of collars 41 each having a flange 42 on which is mounted an annular contoured member 43 for receiving the unit weight, particularly the larger unit weights 31 and 32. For supporting the smaller or lighter unit weights the tube 34 may have mounted thereon collars 44 having integral seats 45 on which the unit weights are supported.

Fixed within the tube 34, wherever required to space the larger unit weights, is a spacing block, such as block 46, having a projection 47 which enters within the convolutions of and retains a spring 48. In the case of the smaller unit weights, the spacers 46 may be omitted. The spring 48 is surrounded by a housing 49 to the upper portion of which the spring is fixed. The housing 49 has integral therewith a flange 51 which is fixed in any suitable manner to the collars 41 or 44, elongated openings being provided in the tube for this purpose. To the flange 51 is sealed the lower end of a metal bellows 52, the upper end of which is sealed to the bottom of a closure plug 53 held in position by a screw 54. The closure plug 53 may be provided with a vertical projection 55 on which spacer block 46 of the adjacent unit is held. Projection 55 may be employed to position spring 48 when spacers 46 are not used.

The closure plug 53 is provided with a vertical passageway 56 which leads into the bellows 52, and a horizontal passageway 57 connected to said vertical passageway. The horizontal passageway is screw threaded to receive one end of a conduit 58 connected to a supply of air under pressure.

Referring to Figs. 2, 4 and 5, the means for selectively depositing a unit weight in operative position will be described. Assuming for the purposes of description that the chart capacity of the weighing scale to be twenty five (25) pounds, the unit weights employed will be such as to counterbalance a load equal to multiples of the chart capacity. Thus, unit weight 24 is of such mass as to counterweight a load of twenty five (25) pounds, unit weight 25 a load of fifty (50) pounds, unit weight 26 a load of one hundred (100) pounds, unit weights 27 and 28 a load of two hundred (200) pounds each, unit weight 29 a load of four hundred (400) pounds, unit weight 30 a load of one thousand (1000) pounds, unit weight 31 a load of two thousand (2000) pounds and unit weight 32 a load of four thousand (4000) pounds. Since any one or all of the unit weights can be employed simultaneously for increasing the capacity of the weighing scale, as will appear below, the capacity thereof may be increased in increments of twenty five (25) pounds to a total capacity of eight thousand (8000) pounds. To increase the capacity of the weighing scale, the mass of each unit weight may be made greater so that the moment thereof counterbalances a greater load.

The wiring diagram in Fig. 5 shows the switching arrangement employed for putting into operation the means for depositing selectively the unit weights on the unit weight carriers 22, electrical energy being obtained from power lines 59 and 61. By operating the hand knob 62 of switch 63, the circuit is closed and energized. The switch units employed for selectively operating the unit weight depositing mechanisms are General Electric Company's cam operated selector switches CR1070 and are indicated by reference numerals 64, 65 and 66. The switches are connected by leads to solenoids which operate valves which control the supply of compressed air to the bellows of the unit weight operating mechanisms.

Thus, lead 67 electrically connects switch 68 and solenoid 69 which operates a Skinner valve 71 which controls the supply of compressed air to the bellows 72 of the mechanism for operating unit weight 24. In like manner, for operating unit weight 25, switch 73, lead 74, solenoid 75, valve 76 and bellows 77 are interconnected; for operating unit weight 26, switch 78, lead 79, solenoid 81, valve 82 and bellows 83; for operating unit weight 27, switch 84, lead 85, solenoid 86, valve 87 and bellows 88; for operating unit weight 28, switch 89, lead 91, solenoid 92, valve 93 and bellows 94; for operating unit weight 29, switch 95, lead 96, solenoid 97, valve 98 and bellows 99; for operating unit weight 30, switch 101, lead 102, solenoid 103, valve 104 and bellows 105; for operating unit weight 31, switch 106, lead 107, solenoid 108, valve 109 and bellows 111; and for operating unit weight 32, switch 112, lead 113, solenoid 114, valve 115 and bellows 52 (see Fig. 2). The compressed air is led from a suitable source of supply to the Skinner valves through a common supply line 116 and is exhausted from said valves through a common discharge pipe 117.

The operation of depositing a unit weight in operative position and removing the same to inoperative position will now be described with particular reference to Fig. 2. Thus, to deposit unit weight 31 on to weight carriers 22, hand knob 118 of selector switch is turned to energize solenoid 108. Energization of solenoid 108 operates Skinner valve 109 which causes air, preferably under a pressure of about thirty (30) pounds per square inch, to flow through conduit 58, passageway 57 and passageway 53 into bellows 111 expanding the latter. The expansion of the bellows effects a movement in a downward direction of housing 49 and the flanged collar 41 attached thereto, at the same time compressing spring 48. The movement of the housing 49 by the expansion of the bellows is of such extent that the unit weight is deposited in operative position on the carrier blocks 22 and the flanged collar below and out of contact with the unit weight. The deposition of the unit weight and the position of the flanged collar, when the unit weight is in operative position, is shown with respect to unit weight 32. When it is desired to remove the unit weight, the solenoid is deenergized by turning the hand knob of the selector switch, which causes the valve to allow the air to be exhausted. The bellows under the action of the spring now contracts, the spring action raises housing 49 and flanged collar 41, lifting the unit weight from carrier blocks 22 and into inoperative position.

As stated, any of the nine unit weights may be deposited selectively in operative position on carrier blocks 22. Thus, if it is desired to increase the capacity of the weighing scale by 1,125 pounds, hand knob 119 of selector switch 66 is turned to operate switch 68, energizing solenoid 69 which operates Skinner valve 71 and supplies compressed air to bellows 72 and in this manner a unit weight 24 having a counterbalancing moment of twenty-five (25) pounds is deposited in operative position. To add the counterbalancing moments of one hundred (100) pounds and one thousand (1000) pounds, hand knobs 121 and 118 are turned to operate switches 78 and 101, respectively, to deposit unit weights 26 and 30, respectively.

The construction described above has the advantage of compactness, i. e., a centrally disposed unit weight operating mechanism self-contained within a relatively small tube.

The mechanism herein employed for operating the unit weights provides an air cushioning effect when the unit weights are dropped into operative position on the cage and when the unit weights are lifted therefrom. For example, in the case of a larger or heavy unit weight, this unit weight in its inoperative position is held up by spring 48. When air enters the interior of the bellows 52, very little pressure is required to start the weight down until it comes into contact with lugs 33. At the instant that the unit weight comes into contact with lugs 33, the unit weights' downward travel is halted momentarily because it is necessary for the bellows to build up sufficient pressure to overcome the effect of the loss of the weight of the unit weight being deposited. This is due to the fact that no weight is helping to push down or compress the spring 48 and therefore it is necessary that the pressure of air be increased to produce this effect. These conditions are reversed when the air is exhausted from the bellows and flange 42 starts to remove the unit weight from lugs 33.

The embodiment of my invention shown and described herein is to be considered merely as illustrative, as my invention, modification and change within the spirit and scope of the appended claims.

I claim:

1. In a weighing scale of the class described, the combination with the load counterbalancing elements of said weighing scale, of a manipulative load counterbalancing means including a unit weight for increasing the chart capacity of said weighing scale, said means comprising a unit weight holder operatively connected to said load counterbalancing elements of said weighing scale, means for supporting said unit weight out of contact with said holder, and fluid operated means for moving said unit weight supporting means so as to cause said unit weight to be deposited on said holder.

2. In a weighing scale of the class described, the combination with the load counterbalancing elements of said weighing scale, of a manipulative load counterbalancing means including a unit weight for increasing the chart capacity of said weighing scale, said means comprising a unit weight holder operatively connected to said load counterbalancing elements of said weighing scale, means for supporting said unit weight out of contact with said holder, fluid operated means for moving said unit weight supporting means so as to cause said unit weight to be deposited on said holder, and a spring operatively connected to said unit weight supporting means for removing said unit weight from said holder.

3. In a weighing scale of the class described, the combination with the load counterbalancing elements of said weighing scale, of a manipulative load counterbalancing means, including a plurality of unit weights, for increasing the chart capacity of said weighing scale, said means comprising a unit weight holder operatively connected to said load counterbalancing elements of said weighing scale, means for individually supporting said unit weights out of contact with said holder, and fluid operated means for moving said unit weight supporting means so as to cause at least one of said unit weights to be deposited on said holder.

4. In a weighing scale of the class described, the combination with the load counterbalancing elements of said weighing scale, of a manipulative load counterbalancing means, including a plurality of unit weights, for increasing the chart capacity of said weighing scale, said means comprising a unit weight holder operatively connected to said load counterbalancing elements of said weighing scale, means for individually supporting said unit weights out of contact with said holder, fluid operated means for moving said unit weight supporting means so as to cause at least one of said unit weights to be deposited on said holder, and a spring operatively connected to each of said unit weight supporting means for removing said unit weights from said holder.

5. In a weighing scale of the class described, the combination with the load counterbalancing elements of said weighing scale, of a manipulated load counterbalancing means, including a unit weight, for increasing the chart capacity of said weighing scale, said means comprising a unit weight holder, including a plurality of rods and a unit weight carrier block fixed to each of said rods, operatively connected to said load counterbalancing elements of said weighing scale, means for supporting said unit weight out of contact with said unit weight holder, and fluid operated means for moving said unit weight supporting means so as to cause said unit weight to be deposited on said carrier blocks of said holder.

6. In a weighing scale of the class described, the combination with the load counterbalancing elements of said weighing scale, of a manipulative load counterbalancing means, including a plurality of unit weights, for increasing the chart capacity of said weighing scale, said means comprising a unit weight holder, including a plurality of rods and a plurality of unit weight carrier blocks fixed to each of said rods, operatively connected to said load counterbalancing elements, means for individually supporting said unit weights out of contact with said holder, and fluid operated for moving said unit weight supporting means so as to cause at least one of said unit weights to be deposited on said carrier blocks of said holder.

7. In a weighing scale of the class described, the combination with the load counterbalancing elements of said weighing scale, of a manipulative load counterbalancing means including a unit weight for increasing the chart capacity of said weighing scale, said means comprising a unit weight holder operatively connected to said load counterbalancing elements of said weighing scale, means including a bellows for supporting said unit weight out of contact with said holder, and means for introducing fluid under pressure into said bellows to expand said bellows to cause said unit weight supporting means to be moved to deposit said unit weight on said holder.

8. In a weighing scale of the class described, the combination with the load counterbalancing elements of said weighing scale, of a manipulative load counterbalancing means, including a plurality of unit weights, for increasing the chart capacity of said weighing scale, said means comprising a unit weight holder operatively connected to said load counterbalancing elements of said weighing scale, means including a separate bellows for supporting each unit weight out of contact with said holder, and means for selectively introducing fluid pressure into any of said bellows to expand the bellows receiving the fluid to cause said unit weight supporting means operatively connected to said bellows to be moved to deposit the unit weight on the latter unit weight supporting means to be deposited on said holder.

9. In a weighing scale of the class described, the combination with the load counterbalancing elements of said weighing scale, of a manipulative load counterbalancing means, including a plurality of unit weights, for increasing the chart capacity of said weighing scale, said means comprising a unit weight holder operatively connected to said load counterbalancing elements of said weighing scale, means including a separate bellows for supporting each unit weight out of contact with said holder, means for selectively introducing fluid pressure into any of said bellows to expand the bellows receiving the fluid to cause said unit weight supporting means operatively connected to said bellows to be moved to deposit the unit weight on the latter unit weight supporting means to be deposited on said holder, and a spring operatively connected to each of said unit weight supporting means for removing said unit weight from said holder.

10. In a weighing scale of the class described, the combination with the load counterbalancing elements of said weighing scale, of a manipulative load counterbalancing means, including a unit weight for increasing the chart capacity of said weighing scale, said means comprising a unit weight holder operatively connected to said load counterbalancing elements of said weighing scale, means including a bellows for supporting said unit weight out of contact with said holder, a spring cooperating with said bellows for maintaining said bellows in collapsed condition, and means for introducing fluid under pressure into said bellows expanding said bellows against the action of said spring thereby causing the unit weight supporting means to be moved to deposit the unit weight supported thereon on said holder.

11. A weighing scale according to claim 10 wherein the means for introducing fluid under pressure into the bellows comprises a manually operated electrical switch, a solenoid operatively connected to said switch and a valve operated by said solenoid for controlling the flow of fluid to said bellows.

12. A weighing scale according to claim 7 wherein the means for introducing fluid under pressure into the bellows comprises a manually operated electrical switch, a solenoid operatively connected to said switch and a valve operated by said solenoid for controlling the flow of fluid to said bellows.

13. A weighing scale according to claim 8 wherein the means for selectively introducing fluid under pressure into the bellows comprises a plurality of manually operated switches, solenoids operatively connected to said switches and valves operated by said solenoids for selectively controlling the flow of fluid to said bellows.

14. In a weighing scale of the class described, the combination with the load counterbalancing elements of said weighing scale, of a manipulative load counterbalancing means, including a plurality of unit weights, for increasing the chart capacity of said weighing scale, said means comprising a unit weight holder, including a plurality of rods and a plurality of unit weight carrier blocks fixed to each of said rods, operatively connected to said load counterbalancing elements, a tube held relative to said holder rods, means carried by said tube for individually supporting said unit weights out of contact with said holder, and fluid operated means for selectively moving said unit weight supporting means to cause said unit weights to be selectively deposited on corresponding carrier blocks on said holder.

15. In a weighing scale of the class described, the combination with the load counterbalancing elements of said weighing scale, of a manipulative load counterbalancing means, including a plurality of unit weights, for increasing the chart capacity of said weighing scale, said means comprising a unit weight holder, including a plurality of rods and a plurality of unit weight carrier blocks fixed to each of said rods, operatively connected to said load counterbalancing elements, a tube held relative to said holder rods, means carried by said tube for individually supporting said unit weights out of contact with said holder, fluid operated means for selectively moving said unit weight supporting means to cause said unit weights to be selectively deposited on corresponding carrier blocks on said holder, and spring means operatively connected to said fluid operated unit weight supporting means for removing said unit weights from said carrier blocks.

16. In a weighing scale of the class described, the combination with the load counterbalancing elements of said weighing scale, of a manipulative load counterbalancing means, including a plurality of unit weights, for increasing the chart capacity of said weighing scale, said means comprising a unit weight holder, including a plurality of rods and a plurality of unit weight carrier blocks fixed to each of said rods, operatively connected to said load counterbalancing elements, a tube held relative to said holder rods, a plurality of separate units carried within said tube each supporting a unit weight, said supporting units each including a support for a unit weight, a housing fixed to said support, a bellows mounted on said housing and a spring within said housing, and means for introducing fluid under pressure to move said support relative to said tube to deposit said unit weights on said carrier blocks on said holder.

17. A weighing scale according to claim 16 wherein the means for introducing fluid under pressure into the bellows comprises a manually operated electrical switch, a solenoid operatively connected to said switch and a valve operated by said solenoid for controlling the flow of fluid to said bellows.

18. In a weighing scale of the class described, the combination with the load counterbalancing elements of said weighing scale, of a manipulative load counterbalancing means, including a plurality of unit weights, for increasing the chart capacity of said weighing scale, said means comprising a unit weight holder, including a plurality of rods and a plurality of unit weight carrier blocks fixed to each of said rods, operatively connected to said load counterbalancing elements, a tube held relative to said holder rods, a plurality of separate units carried within said tube each supporting a unit weight, said supporting units each including a support for a unit weight, a housing fixed to said support, a bellows mounted on said housing and a spring within said housing, and separate means operatively connected to each of said bellows for selectively introducing fluid under pressure into any of said bellows so as to cause the support of said bellows to be moved relative to said tube and deposit the unit weight carried thereon on said carrier blocks of said holder.

19. A weighing scale according to claim 18 wherein the means for introducing fluid under pressure into the bellows comprises a manually operated electrical switch, a solenoid operatively connected to said switch and a valve operated by said solenoid for controlling the flow of fluid to said bellows.

20. In a weighing scale of the class described, the combination with the load counterbalancing elements of said weighing scale, of a manipulative load counterbalancing means, including a unit weight for increasing the chart capacity of said weighing scale, said means comprising a unit weight holder, including a plurality of rods in the form of a cage and unit weight carrier blocks fixed to said rods, operatively connected to said load counterbalancing elements of said weighing scale, a tube held within said cage and spaced from said rods, means for holding said tube in position relative to said cage, means including a bellows and a spring cooperating with said bellows for supporting said unit weight, and means operatively connected to said bellows for introducing fluid under pressure so as to cause said bellows to expand against the action of said spring and move said unit weight relative to said tube so as to cause said unit weight to be deposited on said carrier blocks of said holder, the construction and arrangement being such that when fluid pressure is removed from said bellows, the spring causes the unit weight to be lifted from said carrier blocks of said holder.

HARLAN A. HADLEY.

REFERENCES CITED

The following references are of record in the file of this patent:

UNITED STATES PATENTS

| Number | Name | Date |
| --- | --- | --- |
| 2,346,121 | Weckerly | Apr. 4, 1944 |

Disclaimer and Dedication

2,594,157.—*Harlan A. Hadley*, Burlington, Vt. WEIGHING SCALES. Patent dated Apr. 22, 1952. Disclaimer and dedication filed Jan. 2, 1963, by the assignee, *Toledo Scale Corporation*.

Hereby enters this disclaimer and dedication to the public of all claims in said patent.

[*Official Gazette February 19, 1963.*]